July 13, 1954  W. I. WRIGHT  2,683,389
PROJECTION OF CINEMATOGRAPH FILM
Filed April 25, 1949  3 Sheets-Sheet 1
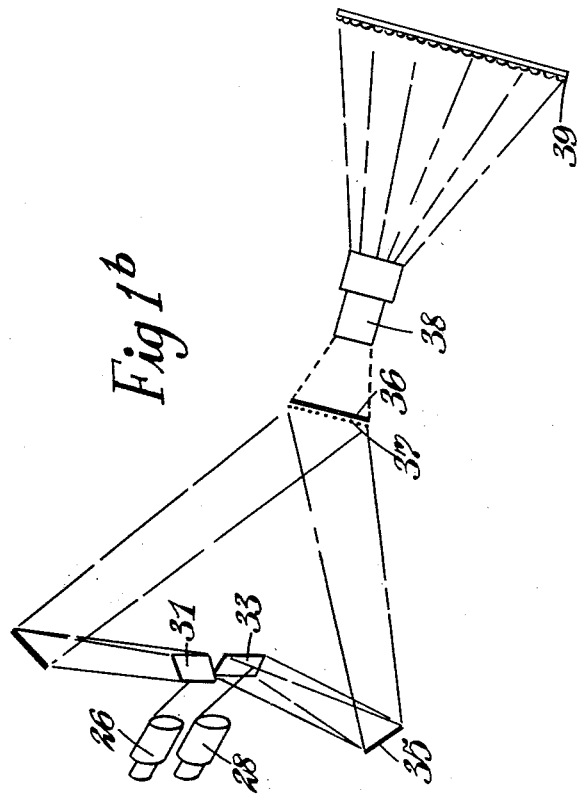
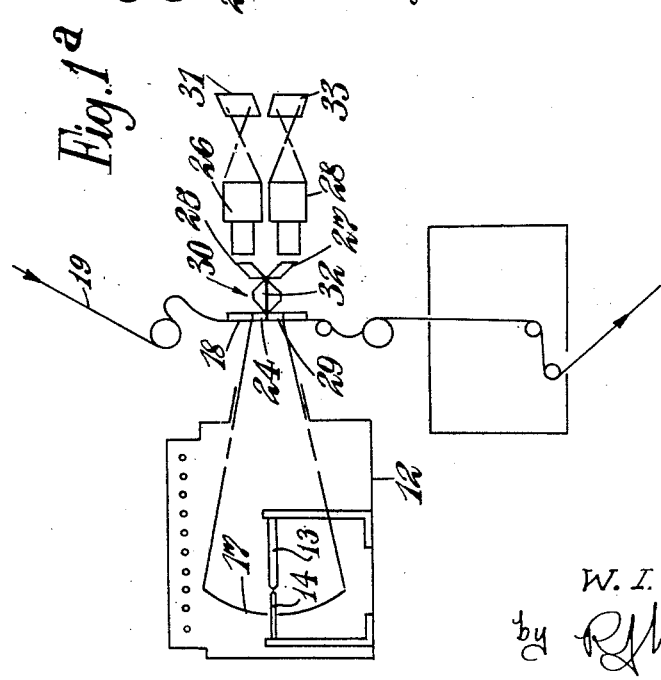
INVENTOR
W. I. WRIGHT July 13, 1954  W. I. WRIGHT  2,683,389
PROJECTION OF CINEMATOGRAPH FILM
Filed April 25, 1949  3 Sheets-Sheet 2
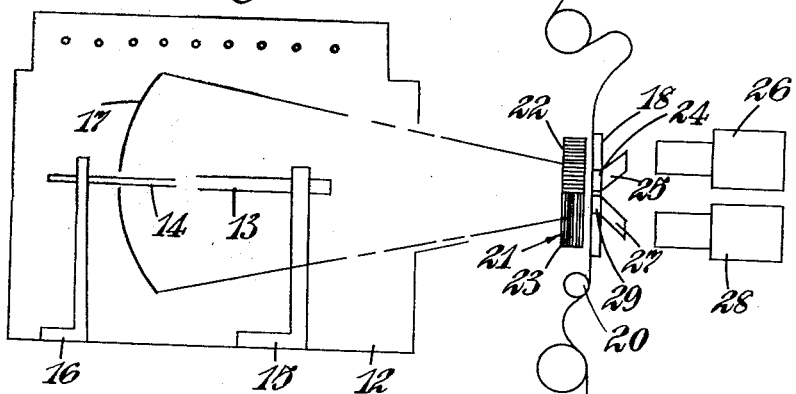
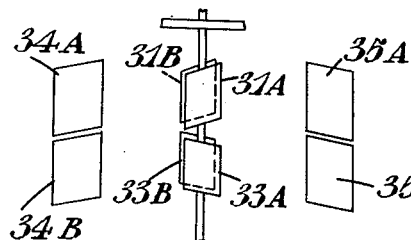
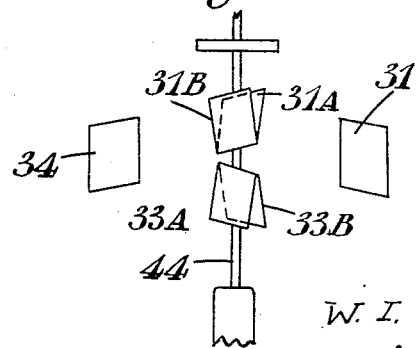
INVENTOR
W. I. WRIGHT
by R. J. Mawhinney
Attorney

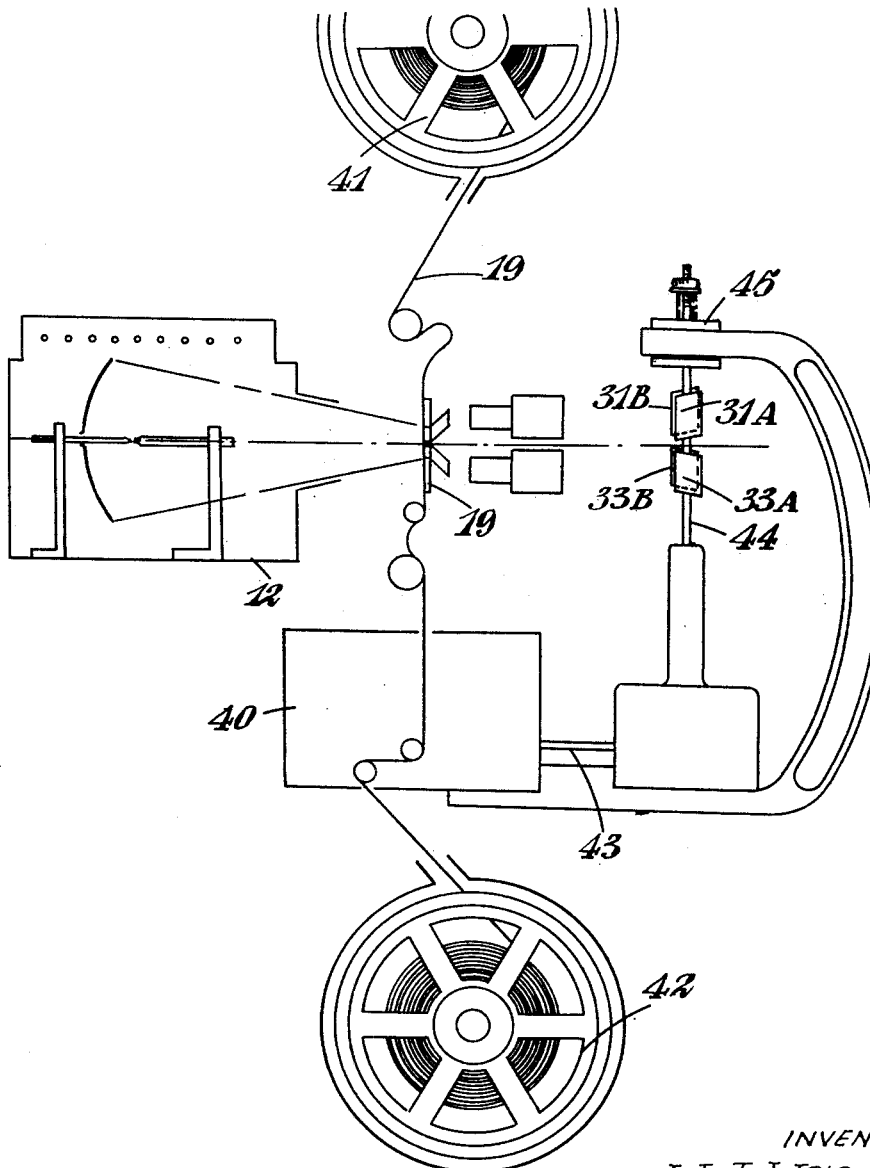

Patented July 13, 1954

2,683,389

UNITED STATES PATENT OFFICE 2,683,389

PROJECTION OF CINEMATOGRAPH FILM

Walter Isaac Wright, Wellington, England

Application April 25, 1949, Serial No. 89,511

Claims priority, application Great Britain
April 26, 1948

6 Claims. (Cl. 88—16.6)

The present invention comprises improvements in or relating to kinematograph film projection. It is an object of the invention to improve existing apparatus for kinematograph film projection. It is a further object to enable conventional non-stereoscopic kinematograph film to be projected so as to give a partial or apparent stereoscopic effect.

The invention is based on the discovery that normal kinematograph film consisting of a single series of separate pictures taken from a single viewpoint (i. e. through a single exposure aperture of a camera taking the separate pictures of the series in a time sequence) nevertheless have pictures which are spaced in the series capable, when taken in pairs, of exhibiting a partial stereoscopic relationship with one another. The pictures so taken may be adjacent frames of the film or may be spaced by up to 12 or even 20 frames apart, and by suitably mounting such pictures in pairs in a stereoscope their relationship may be observed. This relationship is due to the fact that simultaneous stereoscopically related views of an object from a pair of spaced viewpoints is equivalent to a pair of views taken in sequence from a single viewpoint of an object which moves during the time interval of the sequence through a distance similar to that between the space viewpoints. Kinematograph film is normally employed for recording movement so that the relationship referred to above remains true substantially throughout the whole length of a kinematograph film.

Preferably each picture of a film formed by a series of single exposures is projected twice, that is, as one of each of two pairs of pictures in spaced relationship on the film, the other pictures of the two pairs being disposed respectively ahead of and behind the said one picture in the film sequence, the projection being controlled so that any one picture is visible on the screen during both its projections by one and the same eye of the viewer.

It is a further object of the invention to provide improved apparatus for stereoscopically projecting kinematograph film in which two pictures are projected so that said pictures are separately visible to each eye which apparatus comprises projecting means for projecting in pairs frames in spaced relationship on said film, means for moving the film through said projecting means so that successive frames are successively projected and means for insuring that the same eye of the viewer sees the image of the same picture during both its projections.

The invention will be more clearly understood from the following description of examples, reference being made to the accompanying drawings in which:

Figure 1a is a schematic of the projector and optic prisms employed in accordance with the present invention.

Figure 1b is a schematic of the projection lenses and screens arranged in accordance with the present invention.

Figure 1c is a schematic of a projector and polarisation system in accordance with the present invention.

Figure 2 is a schematic of the projector of Figure 1a in greater detail.

Figure 3 shows the reflecting system of Figure 1b in more detail, and

Figure 4 shows a modification of the reflecting system of Figure 3.

In Figures 1a and 1c the lamp house 12 contains the conventional arc carbons 13, 14 supported by brackets 15, 16 respectively and reflector 17. The gate 18 is of sufficient height to take at the same time two frames of the film 19 passing therethrough, the said two frames lying respectively in parts 24 and 29 of the gate 18. 20 is a sprocket moving the film 19 through the gate 18, one frame at a time. The drive mechanism for the film 19 through the gate 18 is of conventional form, it being appreciated that the speed of travel through the gate is the normal speed.

The system illustrated is intended to project on to a projection screen a picture which is partially or apparently stereoscopic when viewed by an audience without special polarised or anaglyph spectacles. The beam through part 24 of the gate 18 first passes through reversing prism 30, deflecting prism 25, projecting lens system 26 and on to the intermittently rotating mirror 31. Similarly the beam of light through the part 29 of the gate 18 passes through reversing prism 32 reflector prism 27, projecting lens system 28 and intermittently rotating mirror 33. From the mirrors 31, 33 the beams of light are projected on to mirrors 34, 35 located at either side of the optical axis of lamp house 12. The beams reflected from mirrors 34, 35 are directed on to ground glass screen 36 having a grid 37 of vertical wires in front of it thus forming a conventional line screen. The two beams strike the surface of the mirror at approximately equal angles to the vertical to the surface. There is thus formed on the surface of the ground glass screen a compound image comprising a multiplicity of line images, similar to a stereogram, in known manner. The projecting lens 38 projects the strip images formed on screen 36 on to a lenticular projection screen 39, the number of strip elements of which is equal to twice the number of wires or lines in grid 37 since each wire or line of grid 37 produces on the ground glass screen two images. The operation of the grid 37 and screen 36 and the lenticular screen 39 in connection with the stereoscopic projection are already well known separately and need not be described in detail. It should be pointed out, however, that their use together has not previously been known and has advantages over preceding screens for use in stereoscopic projection systems in that once the grid 37 and lenticular screen 39 have been located correctly with respect to one another no jitter of the film through the partial or apparent gate will cause the stereoscopic effects to be lost as is the case with previously suggested stereoscopic systems.

The purpose of the intermittently rotating mirrors 31, 33 is to ensure that one eye of an observer shall see the image of the same frame during both its projections. Each oscillating mirror is thus rotated through 90° at each movement of the film through the gate so that after each such movement, the beam of light from lens system 26 is transferred from mirror 34 to mirror 35 or vice versa and the operation to mirror 33 is similar to this.

Figures 2 and 3 illustrate the operation of the intermittently rotating mirrors in greater detail. In Figure 2, 40 is the drive mechanism for the feed of the film through the gate from reel 41 to take up reel 42 shaft 43 from drive mechanism 40 drives through a Maltese cross device intermittently the vertical shaft 44 carrying two pairs of mirrors 31A, 31B, 33A and 33B, the operation being such that on each intermittent movement of the film 19 through the gate the shaft 44 is rotated through 90° and during the time when the film is stationary in the gate, the mirrors are also stationary at an angle of 45° to the optical axis of lamp house 12. The carbon friction plate 45 on the upper end of shaft 44 restrains or damps the movement of the shaft 44. The two pairs of mirrors 31A, 31B and 33A and 33B are mutually at right-angles. Referring to Figure 3, mirrors 31A, 31B, 33A, 33B reflect the beams of light of two mirrors 35A, 34A, 34B and 35B respectively so that on each rotation of shaft 44 through 90° the beams of light from lens systems 26, 28 are thrown on to screen 36 from a different direction.

In order to reduce the number of mirrors directing the beams on to the screen 36, only one mirror 34, 35 may be located at either side of the mirrors 31A, 31B, 33A and 33B as illustrated in Figure 4. In this case, the mirrors secured to shaft 44 are inclined at an angle to the axis of the shaft so that the beams of light reflected by any of the mirrors on shaft 44 are caused to impinge on mirrors 34, 35.

It may be advantageous for some purposes to have the two frames simultaneously projected not adjacent but spaced apart by any number of frames up to say twenty. For example, this is preferable when "slow motion" film is being projected. In this case, two gates illuminated by the same or different sources of light are employed and the gates are synchronized; otherwise the structure and operation is similar to that described with reference to Figure 1.

By means of the apparatus described above, it is possible to project a motion picture film made in conventional manner, i. e. without special stereoscopic cameras, so that it is partially or apparently stereoscopic. Provided the picture is depicting motion of any type, a stereoscopic effect will be apparent. However, if it is desired to have a stereoscopic effect whether the picture is depicting movement or not, the film itself may be stereoscopic in that alternate frames may be stereoscopic. In this case the apparatus above described may be employed unchanged.

I claim:

1. Apparatus for producing a motion picture from a kinematograph film having a succession of image frames, comprising in combination display means, which display means comprise means for producing a compound image comprising a multiplicity of line images from two incident image-projecting beams directed thereon from different directions, alternate line images being derived from the incident beam associated with one of said two directions, and the intervening line images being derived from the incident beam associated with the other of the said two directions, and means for presenting the alternate line images of said compound image for observation by one eye of each of a plurality of observers and for presenting the intervening line images for observation by the other eye of each of said observers; two kinematograph projecting heads having their projecting directions spaced apart in a direction transverse to said projecting directions; means for positioning the film in the projector heads with two different frames positioned for projection simultaneously by the two heads respectively, thereby to project simultaneously two spacially discrete image beams deriving their images from said two frames of the film respectively; means for directing the two image beams on to the display means to constitute the aforementioned two incident beams; which directing means include beam-interchanging means operable to interchange the incident beams; means for moving the film lengthwise of the succession of frames step by step, thereby to change the frames which are projected; and means for operating the beam-interchanging means as aforesaid each time the film is moved one step, whereby images from successive frames projected by each and the same of the two projector heads are presented to the different eyes respectively of each observer.

2. Apparatus for producing a motion picture from a kinematograph film having a succession of image frames, comprising in combination display means, which display means comprise means for producing a compound image comprising a multiplicity of line images from two incident image projecting beams directed thereon from different directions, alternate line images being derived from the incident beam associated with one of said two directions, and the intervening line images being derived from the incident beam associated with the other of the said two directions, and means for presenting the alternate line images of said compound image for observation by one eye of each of a plurality of observers and for presenting the intervening line images for observation by the other eye of each of said observers; two kinematograph projecting heads having their projecting directions spaced apart in a direction transverse to said projecting directions; means for positioning the film in the projector heads with two different frames positioned for projection simultaneously by the two heads respectively, thereby to project simultaneously two spacially discrete image beams deriving their images from said two frames of the film respectively; means for directing the two image beams on to the display means to constitute the aforementioned two incident beams, which directing means include two mirrors which are rotatable to interchange the incident beams; means for moving the film lengthwise of the succession of frames step by step, thereby to change the frames which are projected; and means for rotating the mirrors as aforesaid each time the film is moved one step, whereby images from successive frames projected by each and the same of the two projector heads are presented to the different eyes respectively of each observer.

3. Apparatus according to claim 2, wherein the directing means comprise also at least two stationary mirrors on to which the image beams are directed respectively by the rotatable mirrors and wherein each rotatable mirror is rotatable between two positions in which it directs the image beam which is incident upon it, on to the two stationary mirrors respectively.

4. Apparatus for producing a motion picture from a kinematograph film having a succession of image frames, comprising in combination display means, which display means comprise means for producing a compound image comprising a multiplicity of line images from two incident image projecting beams directed thereon from different directions, alternate line images being derived from the incident beam associated with one of said two directions, and the intervening line images being derived from the incident beam associated with the other of the said two directions, and means for presenting the alternate line images of said compound image for observation by one eye of each of a plurality of observers and for presenting the intervening line images for observation by the other eye of each of said observers; two kinematograph projecting heads having their projecting directions spaced apart in a direction transverse to said projecting directions; means for positioning the film in the projector heads with two different frames positioned for projection simultaneously by the two heads respectively, thereby to project simultaneously two spacially discrete image beams deriving their images from said two frames of the film respectively; means for directing the two image beams on to the display means to constitute the aforementioned two incident beams, which directing means include two reflectors which are movable to interchange the incident beams; means for moving the film lengthwise of the succession of frames step by step, thereby to change the frames which are projected; and means for moving the reflectors as aforesaid each time the film is moved one step, whereby images from successive frames projected by each and the same of the two projector heads are presented to the different eyes respectively of each observer.

5. Apparatus for producing a motion picture from a kinematograph film having a succession of image frames, comprising in combination display means, which display means comprise a translucent diffusing screen, a grid comprising a multiplicity of spaced substantially parallel opaque substantially straight line elements extending over one face of the translucent screen and spaced equidistantly therefrom, whereby a compound image comprising a multiplicity of line images may be produced on the translucent screen by directing thereon, through the grid from different directions each substantially perpendicular to the lengths of the line elements, two image-projecting beams, a lenticular screen comprising a multiplicity of substantially straight strip elements each having a transverse cross-section of lenticular shape and positioned side by side in parallel contiguous relation on the opposite side of the translucent screen from the grid, the lenticular screen being spaced from the translucent screen and the strip elements extending substantially parallel to the line elements, and means for projecting an image of the compound image on to the lenticular screen; two kinematograph projecting heads having their projecting directions spaced apart in a direction transverse to said projecting directions; means for positioning the film in the projecting heads with two different frames positioned for projection simultaneously by the two projector heads respectively, thereby to project simultaneously two spacially discrete image beams deriving their images from said two frames of the film respectively; means for directing the two image beams on to the display means to constitute the aforementioned two image-projecting beams, which directing means include beam-interchanging means operable to interchange the image-projecting beams; means for moving the film lengthwise of the succession of frames step by step, thereby to change the frames which are projected; and means for operating the beam-interchanging means as aforesaid each time the film is moved one step.

6. Apparatus according to claim 5, wherein the lenticular screen extends substantially parallel to the translucent screen and the number of strip elements is twice the number of line elements.

References Cited in the file of this patent

UNITED STATES PATENTS

| Number | Name | Date |
|---|---|---|
| 1,550,214 | Leonard | Aug. 18, 1925 |
| 2,279,281 | Schensted | Aug. 7, 1942 |
| 2,336,938 | Keijzer | Dec. 14, 1943 |
| 2,415,550 | Yarosh | Feb. 11, 1947 |

FOREIGN PATENTS

| Number | Country | Date |
|---|---|---|
| 110,729 | Australia | June 13, 1940 |
| 582,773 | Great Britain | Nov. 27, 1946 |